United States Patent Office 3,516,254
Patented June 23, 1970

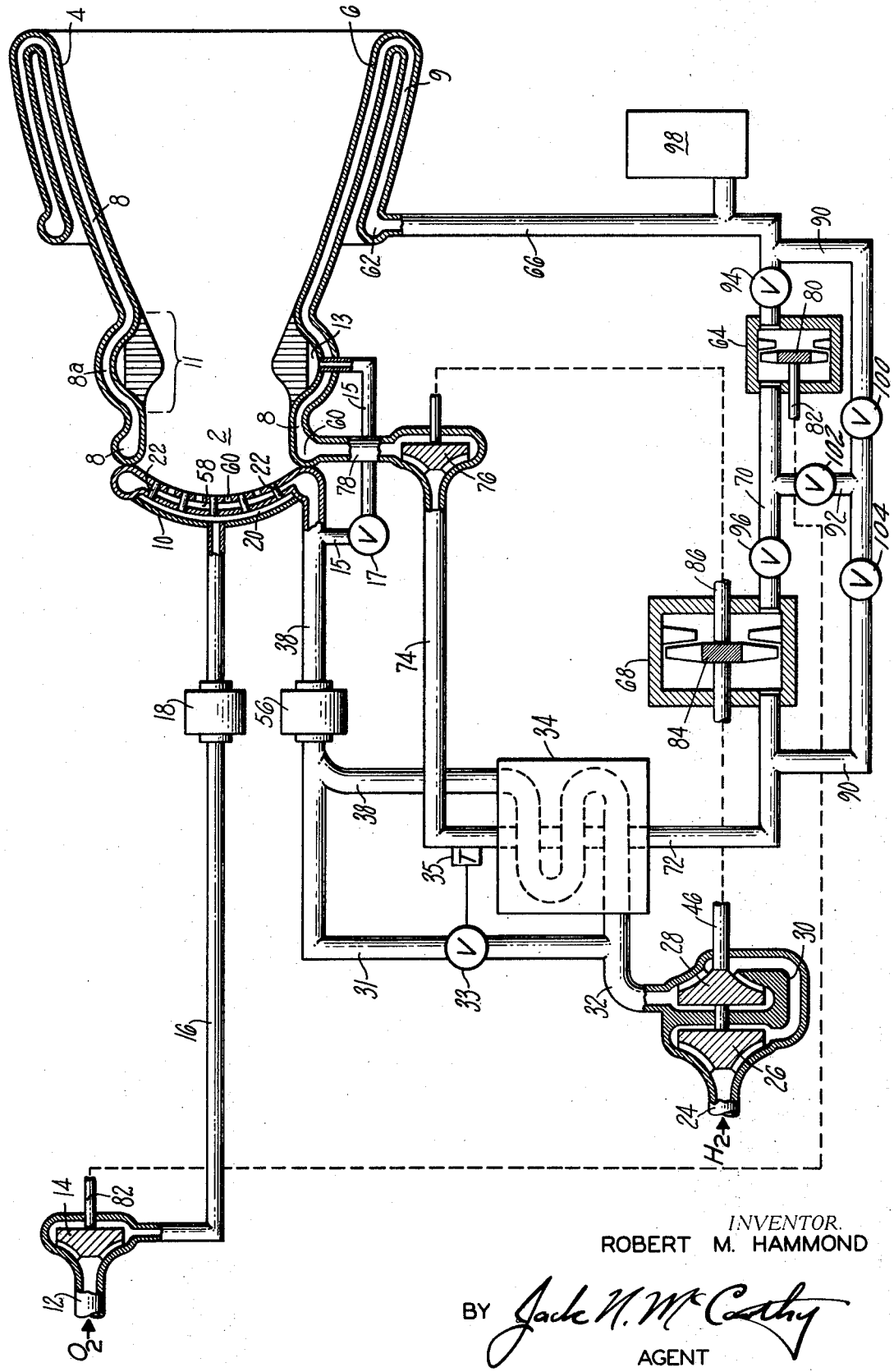

---

3,516,254
CLOSED-LOOP ROCKET PROPELLANT CYCLE
Robert M. Hammond, Palm Beach Gardens, Fla., assignor to United Aircraft Corporation, East Hartford, Conn., a corporation of Delaware
Filed Sept. 11, 1967, Ser. No. 666,628
Int. Cl. F02k 9/02
U.S. Cl. 60—260                                6 Claims

ABSTRACT OF THE DISCLOSURE

A rocket engine having a two-propellant injector has two propellant supply systems for directing propellants to the injector and a separate closed-loop system for cooling the combustion chamber and nozzle and providing system power requirements. In the closed-loop cooling system, a heat exchanger is connected between the system and the flow of one propellant to the injector. Means are also provided to bypass this heat exchanger when desired. Means are also provided to direct a portion of the flow of propellant to the injector away therefrom and use it for film cooling at the throat of the nozzle, if necessary. The closed-loop system shown in the figure includes two turbines, one which drives a pump to direct one propellant and the recirculating pump for the closed-loop system. The other turbine drives the pump for the other propellant. A valving system is provided for dividing recirculating coolant flow through the turbines in any manner desired. An accumulator is attached to the system to maintain it full of cooling fluid.

Background of the invention

This invention relates to a rocket operating cycle and was arrived at to overcome disadvantages of other operating cycles. U.S. Pat. No. 3,049,870 shows a rocket propellant cycle which represents an example of the prior art in this field. However, no prior art constructions are known which set forth the arrangement as it is done in this application.

Summary of invention

A primary object of the present invention is to provide an improved rocket engine cycle which combines qualities of other cycles. For example, (1) as in the gas generator cycle, chamber pressure is not directly dependent on turbine discharge, so that, with sufficient power, attainable chamber pressures are increased for a given pumping capability; (2) as in the preburner or expander cycles, all of the propellants are expanded in the main nozzle thereby resulting in the most efficient utilization of propellants; (3) as in the expander cycle, the energy of the main combustion is used to provide system power, tending to keep weight at a minimum. Because the turbine discharge is not dependent on chamber conditions, the potential is present to take large pressure ratios across the turbines and, thereby, convert a significantly larger percentage of available energy into useful work than is possible with comparable expander cycles.

Brief description of the drawing

The single figure is a schematic diagram of the typical propellant system.

Description of the preferred embodiment

The propellant system is shown in connection with a rocket engine having a combustion chamber 2 and a nozzle 4 communicating therewith, the nozzle and combustion chamber having a cooled wall 6 having passages 8 and 9 therein. Passages 8 may be so designed as to follow the contour of the chamber, throat and nozzle to effect the desired cooling. Passages 8 do not have to follow the contour of the nozzle throat, however, but can extend outwardly from the nozzle as shown at 8a. The nozzle throat as shown by reference numeral 11 is then formed of a porous material, or constructed to permit wall cooling by other means and a chamber 13 is formed around the throat section 11 to receive a fluid to be used as a coolant. A conduit 15 having a control valve 17 located therein is shown having one end connected to the annular chamber 13. The other end of conduit 15 will be attached to a conduit to be hereinafter referred to. The rocket engine also has an injector head 10 forming the end wall of the combustion chamber, this head providing for the admission of the propellants into the combustion chamber.

The propellant system will be described with the propellants being an oxidizer and hydrogen, although it will be understood that the device is applicable to other propellants, at least one of which has the proper temperature characteristics. One propellant, the oxidant, is supplied by a conduit 12 to a pump 14 and thence through a conduit 16 past a control valve 18 to the oxidizer manifold 20 in the injector head. From this manifold, the oxidizer is shown schematically as being injected through tubes 22 into the combustion chamber. The pump 14 delivers the oxidizer at a pressure sufficiently above combustion chamber pressure to assure a desired flow of the oxidizer into the combustion chamber.

The other propellant, hydrogen, is delivered by a supply conduit 24 to a pump having a sufficient number of stages to effect the desired discharge pressure. This pump is shown as having two stages 26 and 28. From the low pressure stage 26, the hydrogen is delivered through a conduit 30 to the inlet of the high pressure pump 28 and a conduit 32 delivers the hydrogen out of the high pressure pump 28 to a heat exchanger 34, the arrangement being such that the hydrogen passes through a plurality of tubes within the heat exchanger. The heat exchanger is represented only schematically and other types of heat exchangers may well be used. From the heat exchanger, a conduit 38 delivers the hydrogen to the hydrogen manifold 58 in the injector head. A control valve 56 is located in conduit 38 to control thrust of the rocket engine. From this manifold, the hydrogen discharges through suitable openings 60 in a face of the injector.

A conduit 31 connects conduit 32 to conduit 38 so that the heat exchanger 34 may be bypassed at specific times during the operation of the engine. A valve 33 is located to control flow through the conduit 31 and is shown controlled by a thermostat 35 which will be hereinafter referred to. The free end of the conduit 15 referred to hereinbefore is connected to conduit 38 adjacent its entry into the injector head.

The free end of all of the passages 8 located adjacent the injector head 10 are all connected to an annular manifold 60 and the free ends of the passages 9 are all connected into an annular manifold 62 located around the nozzle 4. A closed-loop system connects manifold 62 with manifold 60.

This closed-loop system takes the flow of coolant from manifold 62 and directs it to the inlet of a turbine arrangement by conduit 66. This turbine arrangement will be selected to satisfy the requirements of the particular engine. This turbine arrangement is shown as consisting of two turbines 64 and 68. The outlet of the turbine 64 is connected to the inlet of a turbine 68 by a conduit 70. The outlet of the conduit of the turbine 68 is connected to the heat exchanger 34 by a conduit 72. Within the heat exchanger, the cooling fluid comes in proximity with the hydrogen so that the proper heat exchange takes place and the coolant changes from a gaseous to a liquid phase.

From the heat exchanger, a conduit 78 is connected to the inlet of a pump 76 and the outlet of the pump 76 is connected by a conduit 78 to the manifold 60.

The turbine 64 has a rotor 80 mounted therein on a shaft 82 which drives the pump 14. The turbine 68 has a rotor 84 mounted therein on a shaft 86 which drives the pumps 26 and 28 and the recirculating pump 76. Throttling can be effected by reducing the area of the turbine flow bypass valves, said valves being operated with known fuel and oxidizer flow in mixture ratio controls. A system of bypass valving shown consists of a conduit 90 connected to conduit 66 upstream of the inlet of turbine 64 and connected to conduit 72 downstream of the outlet of turbine 68. Another conduit 92 connects conduit 70 to conduit 90. A control valve 94 is located in conduit 66 between the inlet of the turbine 64 and the connection of conduit 90 and a control valve 96 is located in conduit 70 between the inlet of turbine 68 and the connection of conduit 92. A control valve 100 is located in conduit 90 between its connection to conduit 66 and the connection of conduit 92, and a control valve 104 is located in conduit 90 between the connection of conduit 92 and the connection to conduit 72. A control valve 102 is also located in conduit 92. It can be seen here that recirculating coolant flow can be proportionately directed through both turbines or through each turbine individually. An accumulator 98 is connected into the system to maintain the closed-loop system full of coolant. The thermostat 35 referred to above is attached to conduit 74 as it leaves the heat exchanger 34 so that the temperature of the coolant at that point controls the valve 33.

One cooling fluid which has been considered is NH$_3$, and for propellants, besides hydrogen and oxygen, hydrogent and fluorine have also been considered.

Controls as might also be used in connection with conventional rocket engines as shown in U.S. Pat. No. 3,050,936 are also presumed to be present in the system.

I claim:

1. In combination, a rocket engine having an injector head, a combustion chamber and a nozzle wherein:
   (1) means are provided for directing two propellants to said injector head,
      (a) said means including a supply of one propellant,
      (b) first conduit means connected between said supply of one propellant and said injector head,
      (c) first pump means located in said first conduit means for pumping said one propellant from said supply to said injector head,
      (d) a supply of a second propellant,
      (e) third conduit means connected between said supply of a second propellant and said injector head,
      (f) second pump means located in said third conduit means for pumping said second propellant from said supply to said injector head;
   (2) closed-loop means,
      (a) said means having passageway means associated with said nozzle so that a fluid passing therethrough would be affected by the heat in the nozzle,
      (b) said means including second conduit means connecting one end of said passageway means to the other,
      (c) said second conduit means including a recirculating pump therein,
      (d) said second conduit means including turbine means for driving said one propellant pump means and said recirculating pump,
      (e) said second conduit means including second turbine means for driving said second propellant pump means;
   (3) a heat exchanger for transferring heat between said first conduit means of said means for directing two propellants to said injector head and said second conduit means of said closed-loop means,
      (a) said heat exchanger being located in said first conduit means between said supply and said injector head,
      (b) said heat exchanger being located in said second conduit means between said recirculating pump and said turbine means.

2. A combination as set forth in claim 1 wherein said closed-loop means includes:
   (f) valved means for controlling the flow of fluid through both of said turbine means.

3. A combination as set forth in claim 2 wherein said valved means of said closed-loop means includes:
   (g) first valve means in said second conduit means upstream of said second turbine means,
   (h) second valve means located in said second conduit means between said turbine means and second turbine means,
   (i) first bypass conduit means having one end connected to said second conduit means upstream of said first valve means and the other end connected to said second conduit means downstream of said turbine means,
   (j) second bypass conduit means having one end connected to said second conduit means between said second valve means and said second turbine means and the other end connected to said first bypass conduit,
   (k) third valve means located in said first bypass conduit means upstream of said connection of said second bypass conduit,
   (l) fourth valve means located in said first bypass conduit means downstream of said connection of said second bypass conduit,
   (m) fifth valve means located in said second bypass conduit means.

4. In combination, a rocket engine having an injector head, a combustion chamber and a nozzle wherein:
   (1) means are provided for directing two propellants to said injector head,
      (a) said means including a supply of one propellant,
      (b) first conduit means connected between said supply of one propellant and said injector head,
      (c) first pump means located in said first conduit means for pumping said one propellant from said supply to said injector head;
   (2) closed-loop means,
      (a) said means having passageway means associated with said nozzle so that a fluid passing therethrough would be affected by the heat in the nozzle,
      (b) said means including second conduit means connecting one end of said passageway means to the other,
      (c) said second conduit means including a recirculating pump therein,
      (d) said second conduit means including turbine means for driving said one propellant pump means and said recirculating pump;
   (3) a heat exchanger for transferring heat between said first conduit means of said means for directing two propellants to said injector head and said second conduit means of said closed-loop means,
      (a) said heat exchanger being located in said first conduit means between said supply and said injector head,
      (b) said heat exchanger being located in said second conduit means between said recirculating pump and said turbine means;
   (4) bypass means for bypassing said heat exchanger and directing flow from said one propellant pump means directly to said injector head,
      (a) said means including third conduit means, (b) one end of said third conduit means being connected to said first conduit means upstream of said heat exchanger,
(c) the other end of said third conduit means being connected to said first conduit means downstream of said heat exchanger,
(d) valve means in said third conduit means for controlling flow therethrough.
(e) a thermostatic control for controlling flow through said valve means,
(f) said thermostatic control being responsive to the temperature of said second conduit means downstream of said heat exchanger means.

5. In combination, a rocket engine having an injector head, a combustion chamber and a nozzle wherein:
 (1) means are provided for directing two propellants to said injector head,
  (a) said means including a supply of one propellant,
  (b) first conduit means connected between said supply of one propellant and said injector head,
  (c) first pump means located in said first conduit means for pumping said one propellant from said supply to said injector head;
 (2) closed-loop means,
  (a) said means having passageway means associated with said nozzle so that a fluid passing therethrough would be affected by the heat in the nozzle,
  (b) said means including second conduit means connecting one end of said passageway means to the other,
  (c) said second conduit means including a recirculating pump therein,
  (d) said second conduit means including turbine means for driving said one propellant pump means and said recirculating pump;
 (3) a heat exchanger for transferring heat between said first conduit means of said means for directing two propellants to said injector head and said second conduit means of said closed-loop means,
  (a) said heat exchanger being located in said first conduit means between said supply and said injector head,
  (b) said heat exchanger being located in said second conduit means between said recirculating pump and said turbine means;
 (4) the throat of said nozzle being formed of a porous material so that a coolant can flow therethrough,
  (a) an annular chamber formed with said porous material,
  (b) means for directing a coolant to said chamber.

6. A combination as set forth in claim 5 wherein said means for directing a coolant to said chamber of said closed-loop means includes:
 (h) conduit means extending between said first conduit means and said chamber,
 (i) valve means in said passageway.

References Cited
UNITED STATES PATENTS 3,164,955   1/1965   Garraway _____ 60—206

FOREIGN PATENTS 792,909   4/1958   Great Britain.
276,911   8/1930   Italy.

SAMUEL FEINBERG, Primary Examiner

U.S. Cl. X.R.

60—267